United States Patent
Gross

(10) Patent No.: US 9,025,957 B2
(45) Date of Patent: May 5, 2015

(54) UPGRADEABLE PASSIVE OPTICAL FIBER CIRCUIT

(71) Applicant: All Systems Broadband, Inc., Livermore, CA (US)

(72) Inventor: Donald James Gross, Raleigh, NC (US)

(73) Assignee: All Systems Broadband, Inc., Livermore, CA (US)

(*) Notice: Subject to any disclaimer, the term of this patent is extended or adjusted under 35 U.S.C. 154(b) by 155 days.

(21) Appl. No.: 13/949,330

(22) Filed: Jul. 24, 2013

(65) Prior Publication Data

US 2014/0270766 A1   Sep. 18, 2014

Related U.S. Application Data

(60) Provisional application No. 61/787,552, filed on Mar. 15, 2013.

(51) Int. Cl.
*H04Q 11/00* (2006.01)
*H04J 14/02* (2006.01)

(52) U.S. Cl.
CPC ........ *H04Q 11/0005* (2013.01); *H04J 14/0227* (2013.01); *H04Q 2011/0009* (2013.01); *H04Q 2011/0015* (2013.01)

(58) Field of Classification Search
CPC ............. H04J 14/0227; H04J 14/0278; H04Q 2011/0009; H04Q 11/0015
See application file for complete search history.

(56) References Cited

U.S. PATENT DOCUMENTS

| | | | | |
|---|---|---|---|---|
| 6,002,503 A * | 12/1999 | Mizrahi | ........................... | 398/85 |
| 7,623,789 B2 * | 11/2009 | Oberg et al. | .................... | 398/85 |
| 8,064,770 B2 * | 11/2011 | Manna | ............................. | 398/94 |

* cited by examiner

*Primary Examiner* — David Payne
*Assistant Examiner* — Casey Kretzer
(74) *Attorney, Agent, or Firm* — Murphy, Bilak & Homiller, PLLC

(57) ABSTRACT

Optical equipment for 1G-EPON, 10G-EPON, and CWDM services are joined together using a novel combination of optical power splitters and multiplexers. This combination of splitters and multiplexers can be disposed in a single housing, which reduces the size of the combination and improves performance, since jumpers between multiple, separately packaged, optical components can be avoided. One example of the inventive techniques and circuits disclosed herein is a combiner/separator circuit for combining and separating 1G-EPON and 10G-EPON signals. In the example application detailed herein, where EPON equipment is combined with CWDM equipment, an important advantage of this optical circuit is its ability to provide return wavelength isolation for EPON systems that have separate ports for 1G and 10G services.

7 Claims, 4 Drawing Sheets

UPGRADEABLE PASSIVE OPTICAL FIBER CIRCUIT

RELATED APPLICATIONS

This application claims the benefit of and priority to U.S. Provisional Application Ser. No. 61/787,552, filed 15 Mar. 2013. The entire contents of said U.S. Provisional Application are incorporated herein by reference.

TECHNICAL FIELD

The present invention generally relates to optical communications equipment, and particularly relates to optical circuits for combining and separating optical signals carried by optical fibers.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth and lower losses.

Several standards for optical network communications have been developed. One example is the standard for 1-Gbit/second (Gbps) Ethernet Passive Optical Networks, often referred to as 1G-EPON. This standard was ratified as the IEEE 802.3ah standard. Another example is the related standard for 10-Gbit/second Ethernet Passive Optical Networks, referred to as 10G-EPON, which was ratified as the IEEE 802.3av standard. The latter standard supports simultaneous operation of 1 Gbps and 10 Gbps, in both directions, on the same optical fiber plant. In the downstream, or forward, direction, the 10G and 1G signals are sent in the 1575-1580 nanometer band and the 1480-1500 nanometer band, respectively, while the 10G and 1G signals in the upstream, or return, direction occupy the 1260 to 1280 nanometer band and the 1260 to 1360 nanometer band, respectively. (Narrower bandwidth signals are often used in practice.) It will be noted that the upstream bands overlap—as a result, time-division multiplexing is used to separate the 10G and 1G signals in the upstream. FIG. 1 illustrates the forward and return bands for 10G and 1G services.

Coarse Wavelength Division Multiplexing (CWDM) refers to a different set of technologies for carrying multiple optical signals on a single fiber. CWDM systems have channels spaced at 20 nanometers. 18 channels have been specified, at wavelengths ranging from 1270 nanometers to 1610 nanometers. (See the International Telecommunications specification ITU-T G.694.2, "Spectral Grids for WDM Applications: CWDM Wavelength Grid," for additional details.) Eight of these channels are commonly used, at wavelengths of 1470, 1490, 1510, 1530, 1550, 1570, 1590, and 1610 nanometers.

Communications service providers may serve customers with either EPON links, or CWDM links, or both. In scenarios where a communication service provider wishes to provide services using both groups of technologies, optical equipment and fibers may be duplicated. This increases the costs of the operator's network and the physical sizes of the various components. Accordingly, improved techniques and devices for combining multiple optical communications technologies are needed.

SUMMARY

Optical equipment for 1G-EPON, 10G-EPON, and CWDM services are joined together using a novel combination of optical power splitters and multiplexers. This combination of splitters and multiplexers can be disposed in a single housing, which reduces the size of the combination and improves performance, since jumpers between multiple, separately packaged, optical components can be avoided.

One example of the inventive techniques and circuits disclosed herein is a combiner/separator circuit for combining and separating 1G-EPON and 10G-EPON signals. In the example application detailed below, where EPON equipment is combined with CWDM equipment, an important advantage of this optical circuit is its ability to provide return wavelength isolation for EPON systems that have separate ports for 1G and 10G services.

One example embodiment is an optical circuit for combining and separating optical signals carried in optical fibers in each of a plurality of distinct optical channels defined by respective central wavelengths, the optical circuit comprising first, second, and third optical interfaces. In some configurations, the first and third optical interfaces are a 10G Port and 1G Port, respectively, suitable for coupling to EPON equipment in an operator's hub, for example, while the second optical interface is a common (COM) port, for coupling to a fiber distribution plant.

A first three-port combiner/separator filter is coupled to the first optical interface and is configured to pass optical signals in a first optical channel from the first optical interface to a first intermediate node while diverting optical signals in the remaining optical channels from the first optical interface to a second intermediate node, to pass optical signals in the first optical channel from the first intermediate node to the first optical interface while blocking optical signals in the remaining optical channels from the first intermediate node, and to pass optical signals in the first optical channel from the second intermediate node to the first intermediate node while diverting optical signals in the remaining optical channels from the second intermediate node to the first optical interface. The first optical channel may be a 10G EPON forward channel, for example, while the remaining channels may include 1G EPON forward and return channels and one or more CWDM channels.

A second three-port combiner/separator filter is coupled between the first intermediate node, the second optical interface, and a third intermediate node, and is configured to pass optical signals in the first optical channel from the second optical interface to the first intermediate node while diverting optical signals in the remaining optical channels from the second optical interface to the third intermediate node, to pass optical signals in the first optical channel from the first intermediate node to the second optical interface while blocking optical signals in the remaining optical channels from the first intermediate node, and to pass optical signals in the first optical channel from the third intermediate node to the first intermediate node while diverting optical signals in the remaining optical channels from the third intermediate node to the second optical interface. The second three-port combiner/separator filter may be identical to the first one, in some embodiments.

A third three-port combiner/separator filter is coupled between the third intermediate node, the third optical interface, and a fourth intermediate node, and is configured to pass optical signals in second and third optical channels from the third intermediate node to the third optical interface while diverting optical signals in the remaining optical channels from the second optical interface to the fourth intermediate node, to pass optical signals in the second and third optical channels from the third optical interface to the third intermediate node while blocking optical signals in the remaining optical channels from the third optical interface, and to divert optical signals in a fourth optical channel from the fourth intermediate node to the third intermediate node. The second and third optical channels may be 1G EPON forward and return channels, for example, while the fourth optical channel may be a 10G EPON return channel.

The optical circuit further includes a three-port optical circulator coupled between the second and fourth intermediate nodes and an optical load, and configured to pass optical signals in at least the fourth optical channel from the second intermediate node to the fourth intermediate node and to pass optical signals in at least the remaining channels from the fourth intermediate node to the optical load.

Of course, the techniques, systems, and apparatus described herein are not limited to the above features and advantages. Indeed, those skilled in the art will recognize additional features and advantages upon reading the following detailed description, and upon viewing the accompanying drawings.

DETAILED DESCRIPTION

In one aspect of the techniques and systems disclosed herein, optical equipment for 1G-EPON, 10G-EPON, and CWDM services are joined together using a novel combination of optical power splitters and multiplexers. This combination of splitters and multiplexers can be disposed in a single housing, which reduces the size of the combination and improves performance, since jumpers between multiple, separately packaged, optical components can be avoided.

Figure 2:
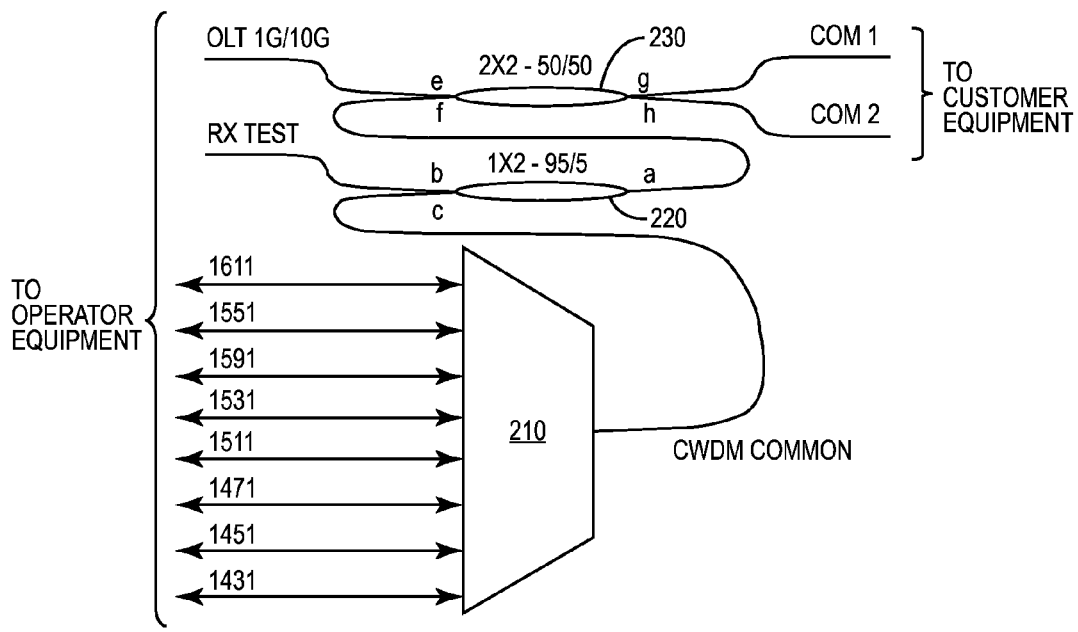
FIG. 2 illustrates an example optical circuit comprising a WDM multiplexer and an optical power splitter configuration.

FIG. 2 is a schematic diagram illustrating an example of such a combination. In this diagram, it is assumed that 10G and 1G signals are handled on a single fiber. Thus, 10G-EPON and 1G-EPON equipment hosted by the service provider connect to the illustrated circuit via a single optical interface labeled "OLT 1G/10G." One particularly advantageous technique for combining 10G-EPON and 1G-EPON signals on a single fiber is detailed later in this document.

In addition to the OLT 1G/10G interface, the illustrated circuit includes a plurality of CWDM ports; in this example these CWDM ports correspond to channels centered at 1431, 1451, 1471, 1511, 1531, 1591, 1551, and 1611 nanometers respectively. It will be appreciated, however, that different combinations of channels and/or a different number of channels may be supported. The CWDM ports are multiplexed to a common optical fiber, labeled CWDM COMMON, using CWDM multiplexer 210. CWDM multiplexer 210 is an optical circuit that combines downstream signals from the CWDM ports onto the CWDM COMMON fiber, while splitting upstream signals from the CWDM COMMON fiber to the respective CWDM ports. CWDM multiplexer 210 may comprise several optical filter components. Because CWDM multiplexers are well known and readily available, further details of their designs are not provided here.

The illustrated circuit further includes identical COM1 and COM2 interfaces, which are for coupling to the operator's distribution network. Downstream signals from the optical circuit of FIG. 2 appear on both the COM1 and COM2 interfaces. Upstream signals received at the COM1 and COM2 interfaces are combined and the combined signals are split and routed to the RX TEST port and to the OLT 1G/10G. Each of the various CWDM channels is also multiplexed to its appropriate interface, i.e., to one of the CWDM ports labeled 1431, 1451, etc.

The CWDM COMMON fiber is coupled to the OLT 1G/10G interface and to the duplicate COM1 and COM2 interfaces via two optical power splitter devices: a one-by-two unequal power-splitter device 220 and a two-by-two power splitter device 230. In the illustrated example, the one-by-two unequal power-splitter device 220 splits the optical power incident at port a between ports b and c, in a ratio of 95:5. Of course, other ratios are possible. The optical signals from port b are fed to a test interface, labeled RX TEST. Optical signals incident at port c are passed to port a with low insertion loss, while only a very tiny fraction of any signals incident at port b are passed to port a. Note that the inclusion of the one-by-two unequal power-splitter device 220 is optional—it can be omitted if a test interface is not needed, or it can be moved to a different location in the optical circuit to monitor particular channels of interest.

In the example circuit of FIG. 2, the two-by-two optical power splitter device 230 combines optical signals incident at ports e and f, and then divides the combined signals into two equal signals emerging from ports g and h. The device performs the same way in the reverse direction, combining the signals incident at ports g and h and dividing the resulting combination of signals equally between ports e and f.

Figure 1:
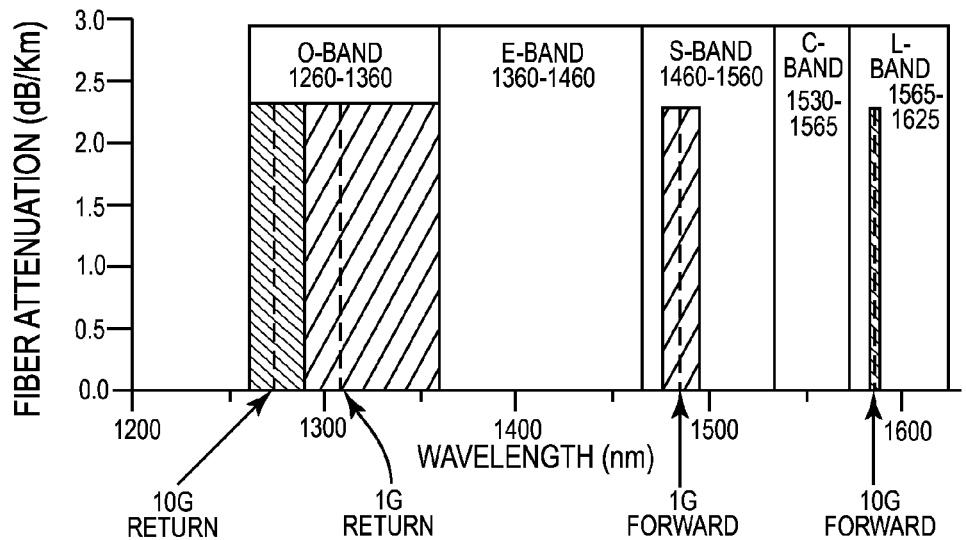
FIG. 1 illustrates the spectral channels for 10G-EPON and 1G-EPON.

It will be appreciated that the result of the combination of devices shown in FIG. 1 is that downstream 1G-EPON, 10G-EPON, and CWDM signals are first combined, and then split equally between the COM1 and COM2 interfaces for distribution. (It will be appreciated that one or more additional power splitters may be coupled to either or both of the COM1 and COM2 interfaces, to provide additional branches for distribution.) Upstream signals arriving at the COM1 and COM2 interfaces from customer premises equipment (CPE) are combined, and then multiplexed (according to optical wavelength) to the appropriate optical interface on the operator side.

Figure 3:
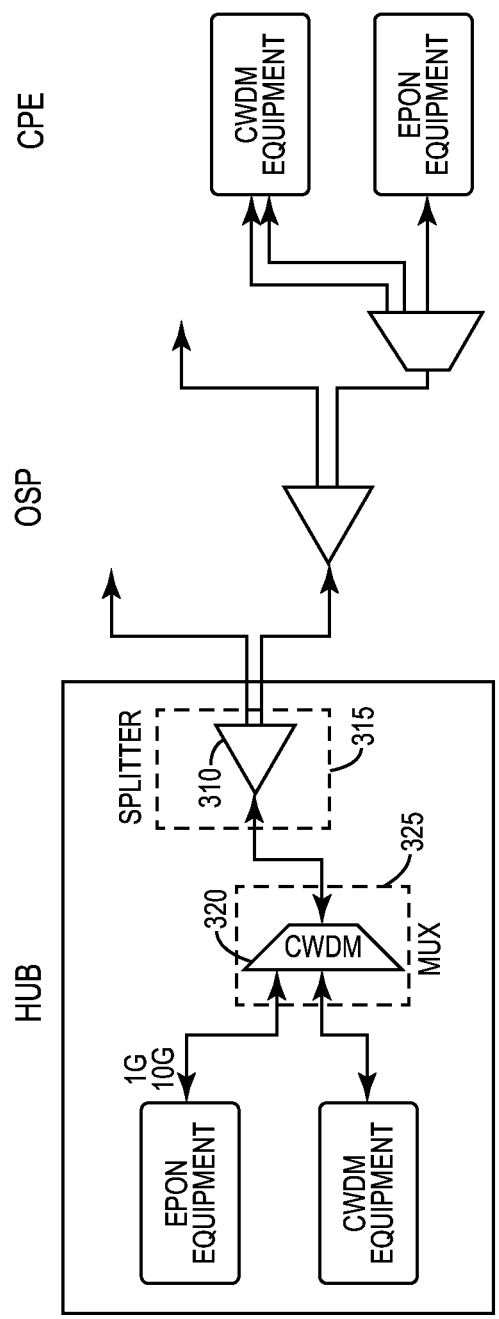
FIG. 3 is a system diagram illustrating one example optical circuit configuration.

FIG. 3 shows one possible application of the circuit shown in FIG. 2. In FIG. 3, an operator's EPON equipment and CWDM equipment are maintained at a hub, which connects to an outside plant (OSP). The OSP connects the hub to customer premises equipment (CPE) at one or more customer sites. As can be seen in the figure, multiplexers and power splitters are used to combine and separate signals at the hub and to perform the reverse operations in the OSP, as the connections are branched to various customer's equipment. In FIG. 3, splitter device 310 and multiplexer device 320 are physically distinct devices, in respective packages 315 and 325. These may be mounted to separate shelves in the operator's equipment cabinets, in some cases, and are connected to one another with an optical jumper. It will be appreciated that this jumper and the corresponding mated-pair connectors at each end contribute loss to the system, while the separate physical packages increases the amount of space needed to house the devices.

Figure 4:
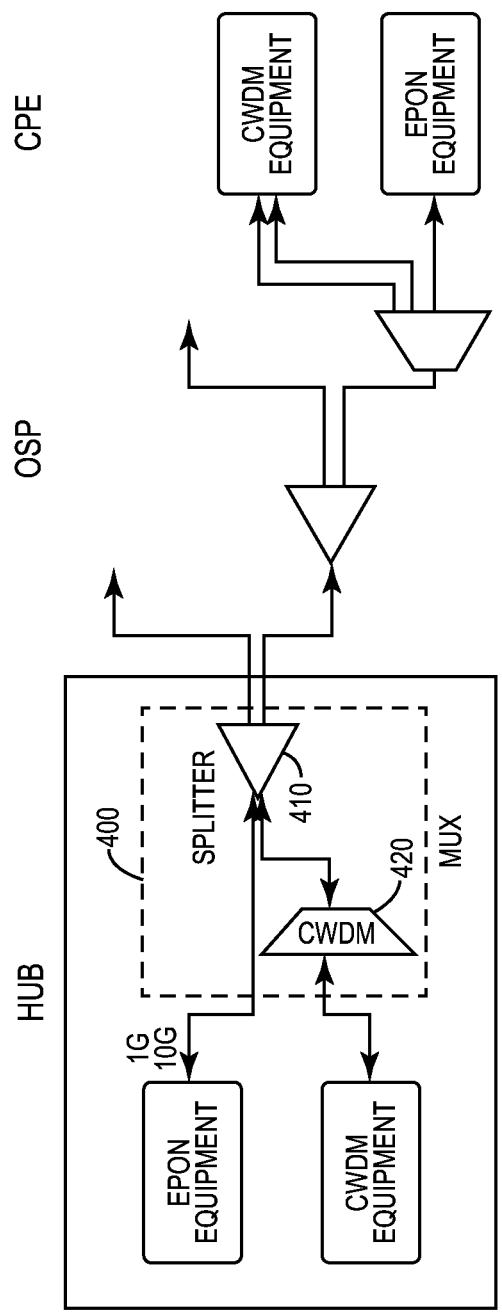
FIG. 4 is a system diagram illustrating another example optical circuit configuration.

In a second aspect of the presently disclosed techniques, the splitter and multiplexer devices shown in the circuit of FIG. 2 are combined into a single housing. An example of this approach is shown in FIG. 4, where housing 400 contains splitter device 410 and multiplexer circuit 420. This approach not only reduces the physical size of the components, but also improves system performance, as optical jumpers and mating connectors are eliminated and replaced by optical splices within the housing 400. Note that the circuit configuration illustrated in FIGS. 2 and 4 also improves performance with respect to the 1G-EPON and 10G-EPON signals, as these signals are no longer passed through the CWDM multiplexer, as was done in the circuit of FIG. 3.

In some embodiments, package 400 may contain an optical circuit like that illustrated in FIG. 2. In various embodiments, the resulting component may be provided with or without a test interface (and thus with or without the one-by-two optical power splitter 220.

Figure 5:
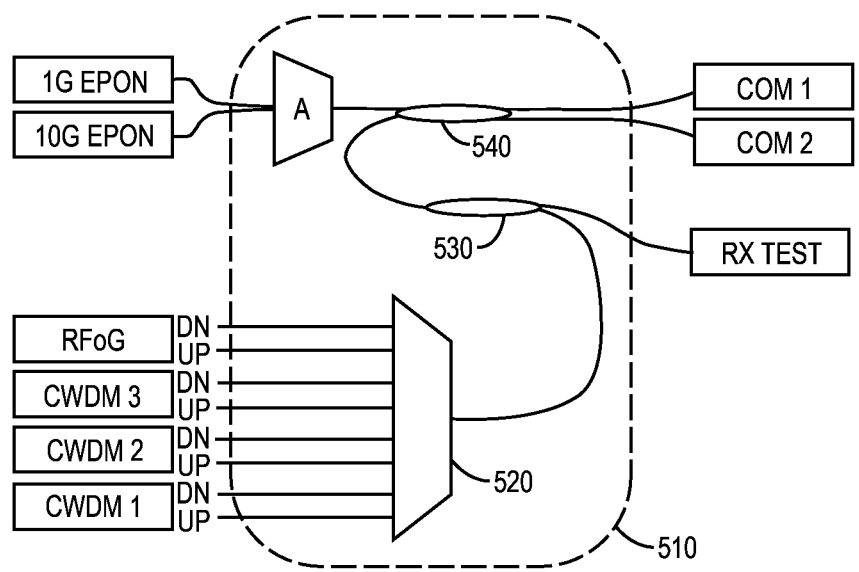
FIG. 5 illustrates an example optical circuit comprising an optical combiner/separator circuit, a WDM multiplexer, and an optical power splitter configuration.

In the circuits and systems illustrated in FIGS. 2, 3, and 4, it was assumed that 1G-EPON and 10G-EPON services have already been combined onto a single fiber. However, a combiner/separator circuit for combining and separating these signals may be combined with the optical circuit of FIG. 2. FIG. 5 shows a simplified view of such a circuit, labeled circuit "A", as combined in a single package 510 with multiplexer 520 and optical power splitters 530 and 540. It will be appreciated that multiplexer 520 and optical power splitters 530 and 540 correspond, at least generally, to the multiplexer 210 and optical power splitters 220 and 230 illustrated in FIG. 2, and that each may comprise one or several optical components such as optical filters, couplers, and the like.

Figure 6:
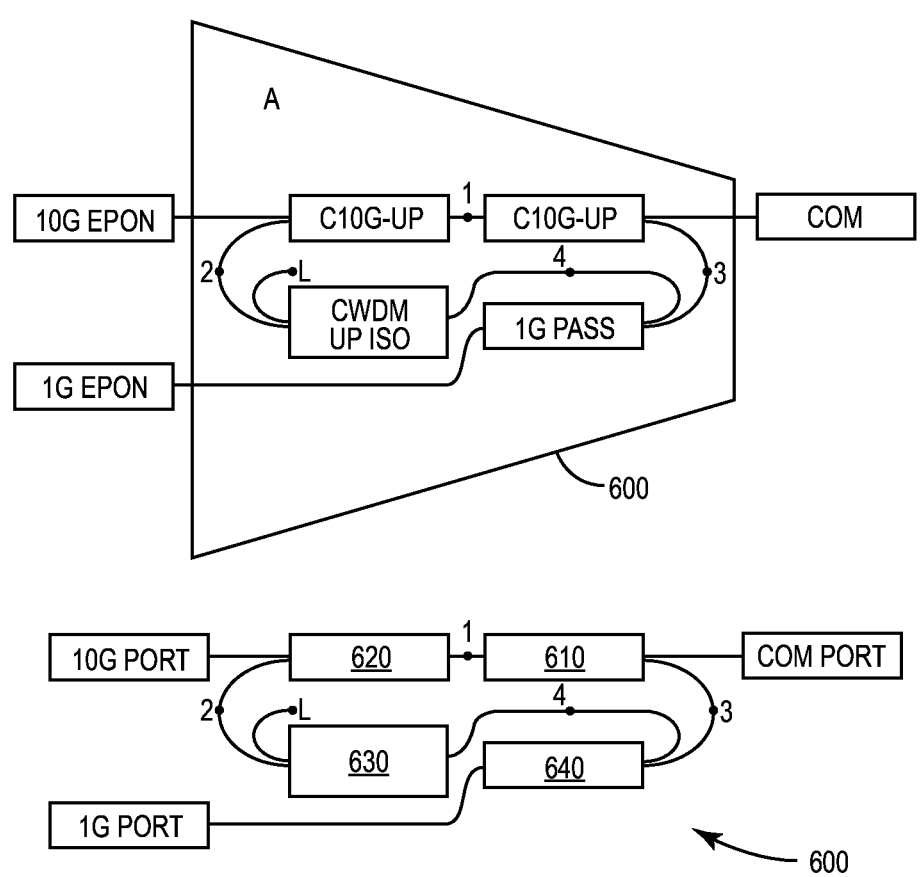
FIG. 6 illustrates details of an example optical combiner/separator circuit.

FIG. 6 illustrates two representations of an exemplary embodiment of the combiner/separator circuit "A," here labeled combiner/separator circuit 600. In the example application discussed here, i.e., where EPON equipment is combined with CWDM equipment, an important advantage of this optical circuit is its ability to provide return wavelength isolation for EPON systems that have separate ports for 1G and 10G services. As discussed above in connection with FIG. 1, the return wavelengths for EPON are close and in some cases overlap.

In FIG. 6, the top representation shows an example of the circuit as applied to an EPON application. The bottom portion of the figure provides a more general representation of the circuit. It should be appreciated that while the detailed discussion that follows will explain the design and operation of this circuit in the EPON context, the circuit may also be used for other wavelengths and/or with other standards.

Referring to the bottom half of FIG. 6, devices 610 and 620 are three-port combiner/separator filters that allow the 10G return wavelength to pass from the common interface (the COM Port) to the 10G-EPON interface (the 10G Port). This narrowband device reflects all other return wavelengths to device 640, which is another three-port combiner/separator filter configured to pass 1G-EPON return wavelengths. Any return wavelengths in the C and L Band that reach device 640 are reflected to device 630, which is a circulator device that passes the return signals to the load L, thus effectively trapping all of the remaining return wavelengths. Note that device 640 is designed to allow both 1G forward and 1G return wavelengths to pass through the device. Thus, the 1G forward signal passes from the 1G-EPON interface (the 1G Port) to the COM Port, with minimal loss. It will be appreciated that device 640 is a broader bandwidth device than devices 610 and 620. The 10G forward wavelength from the 10G Port will reflect from device 620, pass through device 630, reflect off of device 640 towards device 610, and reflect back to the COM Port from device 610.

Somewhat more generally, it will be appreciated that FIG. 6 illustrates an optical circuit 600 for combining and separating optical signals carried in optical fibers in each of a plurality of distinct optical channels defined by respective central wavelengths. Optical circuit 600 includes first, second, and third optical interfaces suitable for connections to other circuits, distribution, fibers, etc. In this particular example, the first, second, and third optical interfaces are the 10G Port, the COM Port, and the 1G Port, respectively.

Optical circuit 600 includes a first three-port combiner/separator filter 620 coupled to the first optical interface and configured to pass optical signals in a first optical channel (e.g., the 10G return wavelength) from the first optical interface to a first intermediate node, while diverting optical signals in the remaining optical channels from the first optical interface to a second intermediate node. These first and second intermediate nodes are labeled "1" and "2" in FIG. 6. The first three-port combiner is also configured to pass optical signals in the first optical channel from the first intermediate node to the first optical interface while blocking optical signals in the remaining optical channels from the first intermediate node, and to pass optical signals in the first optical channel from the second intermediate node to the first intermediate node while diverting optical signals in the remaining optical channels from the second intermediate node to the first optical interface. In the example illustrated in the top half of FIG. 6, the first three-port combiner/separator filter is designed to pass 10G return wavelengths (10G-up)—it will be appreciated that filters designed for a passband at 1270 nanometers are well known and are readily available and/or may be adapted to meet the bandwidth requirements of a 10G return signal.

Optical circuit 600 further includes a second three-port combiner/separator filter 610 coupled between the first intermediate node, the second optical interface, and a third intermediate node, labeled "3" in FIG. 6. This second three-port combiner/separator filter, which may be identical to the first three-port combiner/separator filter, is further configured to pass optical signals in the first optical channel from the second optical interface to the first intermediate node while diverting optical signals in the remaining optical channels from the second optical interface to the third intermediate node, to pass optical signals in the first optical channel from the first intermediate node to the second optical interface while blocking optical signals in the remaining optical channels from the first intermediate node, and to pass optical signals in the first optical channel from the third intermediate node to the first intermediate node while diverting optical signals in the remaining optical channels from the third intermediate node to the second optical interface.

Optical circuit 600 further includes a third three-port combiner/separator filter 640 coupled between the third intermediate node, the third optical interface, and a fourth intermediate node, labeled "4" in FIG. 6. This third three-port combiner/separator filter is configured to pass optical signals in second and third optical channels (e.g., 1G forward and return wavelengths) from the third intermediate node to the third optical interface while diverting optical signals in the remaining optical channels from the second optical interface to the fourth intermediate node, to pass optical signals in the second and third optical channels from the third optical interface to the third intermediate node while blocking optical signals in the remaining optical channels from the third optical interface, and to divert optical signals in a fourth optical channel (e.g., the 10G forward wavelength) from the fourth intermediate node to the third intermediate node. In the example circuit shown in the top half of FIG. 6, the third three-port combiner/separator filter is designed to pass both 1G forward and 1G return signals—again, these devices are well known to the industry.

Finally, optical circuit 600 includes a three-port optical circulator coupled between the second and fourth intermediate nodes and an optical load (labeled "L" in FIG. 6), and configured to pass optical signals in at least the fourth optical channel (e.g., the 10G forward wavelength) from the second intermediate node to the fourth intermediate node and to pass optical signals in at least the remaining channels from the fourth intermediate node to the optical load, thus preventing those signals from reaching the second intermediate node.

It will be appreciated that optical circuit 600, or variants thereof, can be combined with the techniques, circuits, and systems described above in connection with FIGS. 2, 3, and 4. More particularly, it should be appreciated that optical circuit 600 may be included in a single housing with a multiplexer and an optical splitter circuit, such as is shown in FIG. 5. One example of a suitable housing is package that is approximately 102 mm by 58 mm by 13 mm, and is equipped with thirteen LC/APC adapters coupled to the thirteen interfaces shown in FIG. 15. Of course, other configurations, packages, connector types, etc., may also be suitable, depending on the specific application.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. An optical circuit for combining and separating optical signals carried in optical fibers in each of a plurality of distinct optical channels defined by respective central wavelengths, the optical circuit comprising:
   first, second, and third optical interfaces;
   a first three-port combiner/separator filter coupled to the first optical interface and configured to pass optical signals in a first optical channel from the first optical interface to a first intermediate node while diverting optical signals in the remaining optical channels from the first optical interface to a second intermediate node, to pass optical signals in the first optical channel from the first intermediate node to the first optical interface while blocking optical signals in the remaining optical channels from the first intermediate node, and to pass optical signals in the first optical channel from the second intermediate node to the first intermediate node while diverting optical signals in the remaining optical channels from the second intermediate node to the first optical interface;
   a second three-port combiner/separator filter coupled between the first intermediate node, the second optical interface, and a third intermediate node, and configured to pass optical signals in the first optical channel from the second optical interface to the first intermediate node while diverting optical signals in the remaining optical channels from the second optical interface to the third intermediate node, to pass optical signals in the first optical channel from the first intermediate node to the second optical interface while blocking optical signals in the remaining optical channels from the first intermediate node, and to pass optical signals in the first optical channel from the third intermediate node to the first intermediate node while diverting optical signals in the remaining optical channels from the third intermediate node to the second optical interface;
   a third three-port combiner/separator filter coupled between the third intermediate node, the third optical interface, and a fourth intermediate node, and configured to pass optical signals in second and third optical channels from the third intermediate node to the third optical interface while diverting optical signals in the remaining optical channels from the third intermediate node to the fourth intermediate node, to pass optical signals in the second and third optical channels from the third optical interface to the third intermediate node while blocking optical signals in the remaining optical channels from the third optical interface, and to divert optical signals in a fourth optical channel from the fourth intermediate node to the third intermediate node; and
   a three-port optical circulator coupled between the second and fourth intermediate nodes and an optical load, and configured to pass optical signals in at least the fourth optical channel from the second intermediate node to the fourth intermediate node and to pass optical signals in at least the remaining optical channels from the fourth intermediate node to the optical load.

2. The optical circuit of claim 1, wherein:
   the first and fourth optical channels are 10G EPON forward and return channels, respectively;
   the second and third optical channels are 1G EPON forward and return channels, respectively; and
   the plurality of optical channels further comprise one or more Coarse Wavelength Division Multiplexing (CWDM) or Dense Wavelength Division Multiplexing (DWDM) channels.

3. The optical circuit of claim 1, wherein:
   the first and fourth optical channels have nominal central wavelengths of 1570 nanometers and 1270 nanometers, respectively;
   the second and third optical channels have nominal central wavelengths of 1490 and 1310 nanometers, respectively; and
   the plurality of optical channels further comprise one or more channels having central wavelengths of at least 1430 nanometers.

4. The optical circuit of claim 1, further comprising:
   a two-by-two optical power splitter device having first, second, third, and fourth splitter ports, and configured so that optical signals entering the first and second splitter ports are combined and then split between the third and fourth splitter ports and optical signals entering the third and fourth splitter ports are combined and then split between the first and second ports; and
   a Coarse Wavelength Division Multiplexing (CWDM) multiplexer device configured to multiplex a plurality of CWDM channels between a plurality of CWDM forward and return ports and a common port;
wherein the second optical interface and the common port of the CWDM multiplexer device are coupled to the first and second splitter ports of the two-by-two optical power splitter device, the third and fourth splitter ports of the two-by-two optical power splitter device providing first and second distribution network interfaces.

5. The optical circuit of claim 4, wherein the first, second, and third three-port combiner/separator filters, the three-port optical circulator, the two-by-two optical power splitter device, and the CWDM multiplexer device are disposed in a single housing, such that the first, second and third optical interfaces, the first and second distribution network interfaces, and one or more of the plurality of CWDM forward and return ports are accessible from outside the single housing.

6. The optical circuit of claim 1, further comprising:
a two-by-two optical power splitter device having first, second, third, and fourth splitter ports, and configured so that optical signals entering the first and second splitter ports are combined and then split between the third and fourth splitter ports and optical entering the third and fourth splitter ports are combined and then split between the first and second ports;
a one-by-two optical power splitter device having first, second, and third splitter port, and configured so that optical signals entering the first splitter port are split unequally between the second splitter port and the third splitter port and optical signals entering the second splitter port are split unequally between the first splitter port and the third splitter port; and
a Coarse Wavelength Division Multiplexing (CWDM) multiplexer device configured to multiplex a plurality of CWDM channels between a plurality of CWDM forward and return ports and a common port;
wherein the second optical interface is coupled to the first splitter port of the two-by-two optical power splitter device, the first splitter port of the one-by-two optical power splitter device is coupled to the second splitter port of the two-by-two optical power splitter device, the common port of the CWDM multiplexer device is coupled to the second splitter port of the one-by-two optical power splitter device, the third splitter port of the one-by-two optical power splitter device providing a test interface, and the third and fourth splitter ports of the two-by-two optical power splitter device providing first and second distribution network interfaces.

7. The optical circuit of claim 6, wherein the first, second, and third three-port combiner/separator filters, the three-port optical circulator, the two-by-two optical power splitter device, the one-by-two optical power splitter device, and the CWDM multiplexer device are disposed in a single housing, such that the first, second and third optical interfaces, the test interface, the first and second distribution network interfaces, and one or more of the plurality of CWDM forward and return ports are accessible are accessible from outside the single housing.

* * * * *